(12) United States Patent
Muñoz De La Torre Alonso et al.

(10) Patent No.: US 11,706,309 B2
(45) Date of Patent: Jul. 18, 2023

(54) DISCOVERY OF A COLLABORATIVE PROXY NODE IN A 3GPP COMMUNICATION NETWORK

(71) Applicant: Telefonaktiebolaget LM Ericsson (publ), Stockholm (SE)

(72) Inventors: Miguel Angel Muñoz De La Torre Alonso, Madrid (ES); Marcus Ihlar, Älvsjö (SE); Zaheduzzaman Sarker, Järfälla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/772,642

(22) PCT Filed: Jan. 30, 2020

(86) PCT No.: PCT/EP2020/052238
§ 371 (c)(1),
(2) Date: Apr. 28, 2022

(87) PCT Pub. No.: WO2021/083553
PCT Pub. Date: May 6, 2021

(65) Prior Publication Data
US 2022/0385741 A1  Dec. 1, 2022

(30) Foreign Application Priority Data

Oct. 31, 2019  (EP) ..................... 19382953

(51) Int. Cl.
*G06F 15/16* (2006.01)
*H04L 67/564* (2022.01)
(Continued)

(52) U.S. Cl.
CPC ............ *H04L 67/564* (2022.05); *H04L 41/12* (2013.01); *H04L 67/02* (2013.01)

(58) Field of Classification Search
CPC ........ H04L 67/564; H04L 67/02; H04L 41/12
(Continued)

(56) References Cited

U.S. PATENT DOCUMENTS

| 6,918,113 | B2* | 7/2005 | Patel | ............... H04L 67/5681 |
| | | | | 709/219 |
| 9,390,155 | B2* | 7/2016 | Otala | ..................... G06F 16/51 |

(Continued)

OTHER PUBLICATIONS

3GPP, "3rd Generation Partnership Project; Technical Specification Group Core Network and Terminals; 5G System; Network Exposure Function Northbound APIs; Stage 3 (Release 16)", 3GPP TS 29.522 V16.1.0, Sep. 2019, pp. 1-82.
(Continued)

*Primary Examiner* — Moustafa M Meky
(74) *Attorney, Agent, or Firm* — Murphy, Bilak & Homiller, PLLC

(57) ABSTRACT

There is provided mechanisms for enabling discovery of a collaborative proxy node in a 3GPP communication network. A method is performed by a network exposure function. The method comprises obtaining, from a content providing application function, a request for a cooperative performance enhancement service to be performed for application traffic between the application function and a user equipment, the cooperative performance enhancement service being performed by the cooperative performance enhancement node. The method comprises providing, upon having authorized the request, parameters as obtained in the request to a policy control function, thereby enabling discovery of the cooperative performance enhancement node.

14 Claims, 8 Drawing Sheets

(51) Int. Cl.
*H04L 41/12* (2022.01)
*H04L 67/02* (2022.01)

(58) Field of Classification Search
USPC .......................................................... 709/223
See application file for complete search history.

(56) References Cited

U.S. PATENT DOCUMENTS

| | | | | |
|---|---|---|---|---|
| 9,514,157 | B2 * | 12/2016 | Hamburg | G06F 16/51 |
| 9,577,830 | B2 * | 2/2017 | Bishop | H04L 9/3268 |
| 9,654,548 | B2 * | 5/2017 | Arai | H04L 67/10 |
| 10,015,293 | B2 * | 7/2018 | Seed | H04W 4/70 |
| 11,178,250 | B2 * | 11/2021 | Shribman | H04L 67/06 |
| 11,233,872 | B2 * | 1/2022 | Shribman | H04L 63/0407 |
| 2015/0019754 | A1 * | 1/2015 | O'Neill | H04L 45/02 |
| | | | | 709/238 |
| 2015/0235015 | A1 * | 8/2015 | Holler | H04L 67/5683 |
| | | | | 709/213 |
| 2016/0119837 | A1 * | 4/2016 | Wang | H04L 63/20 |
| | | | | 370/331 |
| 2021/0042160 | A1 * | 2/2021 | Alamouti | G06F 9/5011 |
| 2021/0334731 | A1 * | 10/2021 | Todd | G06Q 10/06398 |

OTHER PUBLICATIONS

3GPP, "3rd Generation Partnership Project; Technical Specification Group Services and System Aspects; Study on Enhancing Topology of SMF and UPF in 5G Networks (Release 16)", 3GPP TR 23.726 V1.4.0, Dec. 2018, pp. 1-96.

3GPP, "3rd Generation Partnership Project; Technical Specification Group Services and System Aspects; System Architecture for the 5G System; Stage 2 (Release 16)", 3GPP TS 23.501 Draft V16.0.0+, Interim Draft Not for CRs, Feb. 2019, pp. 1-289.

* cited by examiner

US 11,706,309 B2

DISCOVERY OF A COLLABORATIVE PROXY NODE IN A 3GPP COMMUNICATION NETWORK

TECHNICAL FIELD

Embodiments presented herein relate to methods, a network exposure function, a policy control function, a user plane function, computer programs, and a computer program product for enabling discovery of a collaborative proxy node in a 3GPP communication network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is data collection and analytics.

It is common practice for a network operator to capture traffic traversing its network for monitoring, inspection and/or classification, so that necessary measures can be taken to ensure good network health and/or user experience. When unencrypted application and/or transport protocols (such as the Hypertext Transfer Protocol (HTTP), partially HTTP secure (HTTPS) or the Transmission Control Protocol (TCP)) are used, network operators usually do not require close collaboration with service providers.

However, as service providers are deploying encrypted protocols (such as HTTP/3 or QUIC), it is becoming more challenging for network operators to use traffic for network monitoring or application optimization purposes in a non-collaborative/transparent way.

Hence, there is still a need for enabling efficient monitoring, inspection and/or classification of traffic in a communications network.

SUMMARY

An object of embodiments herein is to provide efficient monitoring, inspection and/or classification of traffic in a communications network, such as in a third generation partnership project (3GPP) communication network, by use of a collaborative proxy service as provided by a collaborative proxy node.

A particular object of embodiments herein is therefore to enable discovery of a collaborative proxy node.

According to a first aspect there is presented a method for enabling discovery of a collaborative proxy node in a 3GPP communication network. The method is performed by a network exposure function. The method comprises obtaining, from a content providing application function, a request for a collaborative proxy service to be performed for application traffic between the application function and a user equipment, the collaborative proxy service being performed by the collaborative proxy node. The method comprises providing, upon having authorized the request, parameters as obtained in the request to a policy control function, thereby enabling discovery of the collaborative proxy node.

According to a second aspect there is presented a network exposure function for enabling discovery of a collaborative performance enhancement node in a 3GPP communication network, the network exposure function comprising processing circuitry, the processing circuitry being configured to cause the network exposure function to perform a method according to the first aspect.

According to a third aspect there is presented a computer program for enabling discovery of a collaborative proxy node in a 3GPP communication network, the computer program comprising computer program code which, when run on processing circuitry of a network exposure function, causes the network exposure function to perform a method according to the first aspect.

According to a fourth aspect there is presented a method for enabling discovery of a collaborative proxy node in a 3GPP communication network. The method is performed by a policy control function. The method comprises obtaining, from a network exposure function, parameters pertaining to a request for a collaborative proxy service to be performed for application traffic between a content providing application function and a user equipment, the collaborative proxy service being performed by the collaborative proxy node. The method comprises providing a request to a user data repository to retrieve policy data for the user equipment. The method comprises obtaining, from the user data repository, the policy data for the user equipment, the policy data at least comprising a policy for the collaborative proxy service. The method comprises providing, to a session management function, an indication for requesting the collaborative proxy service to be performed for application traffic, the request being accompanied by policy and charging rules, as created for an application of the application traffic, thereby enabling discovery of the collaborative proxy node.

According to a fifth aspect there is presented policy control function for enabling discovery of a collaborative proxy node in a 3GPP communication network, the policy control function comprising processing circuitry, the processing circuitry being configured to cause the policy control function to perform a method according to the fourth aspect.

According to a sixth aspect there is presented a computer program for enabling discovery of a collaborative proxy node in a 3GPP communication network, the computer program comprising computer program code which, when run on processing circuitry of a policy control function, causes the policy control function to perform a method according to the fourth aspect.

According to a seventh aspect there is presented a method for enabling discovery of a collaborative proxy node in a 3GPP communication network. The method is performed by a user plane function. The method comprises obtaining, from a session management function, a request for the user plane function entity to forward application traffic between a content providing application function and a user equipment to the collaborative proxy node. The method comprises selecting the collaborative proxy node from a set of at least one available collaborative proxy node. The method comprises providing, to the session management function, a response, the response comprising an identifier of the selected collaborative proxy node, thereby enabling discovery of the collaborative proxy node.

According to an eight aspect there is presented a user plane function for enabling discovery of a collaborative proxy node in a 3GPP communication network, the user plane function comprising processing circuitry, the processing circuitry being configured to cause the user plane function to perform a method according to the seventh aspect.

According to a tenth aspect there is presented a computer program for enabling discovery of a collaborative proxy node in a 3GPP communication network, the computer program comprising computer program code which, when run on processing circuitry of a user plane function, causes the user plane function to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously, these methods, this network exposure function, this policy control function, this user plane function, these computer programs, and this computer program product enable efficient discovery of the collaborative proxy node in the 3GPP communication network.

Such an efficient discovery of the collaborative proxy node is advantageous in the context of requesting network support for particular (encrypted) application traffic.

Advantageously, by hosting the collaborative proxy node in the 3GPP communication network, fast deployment and simple usage of policy enforcement for performance enhancement via the collaborative proxy node is enabled.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
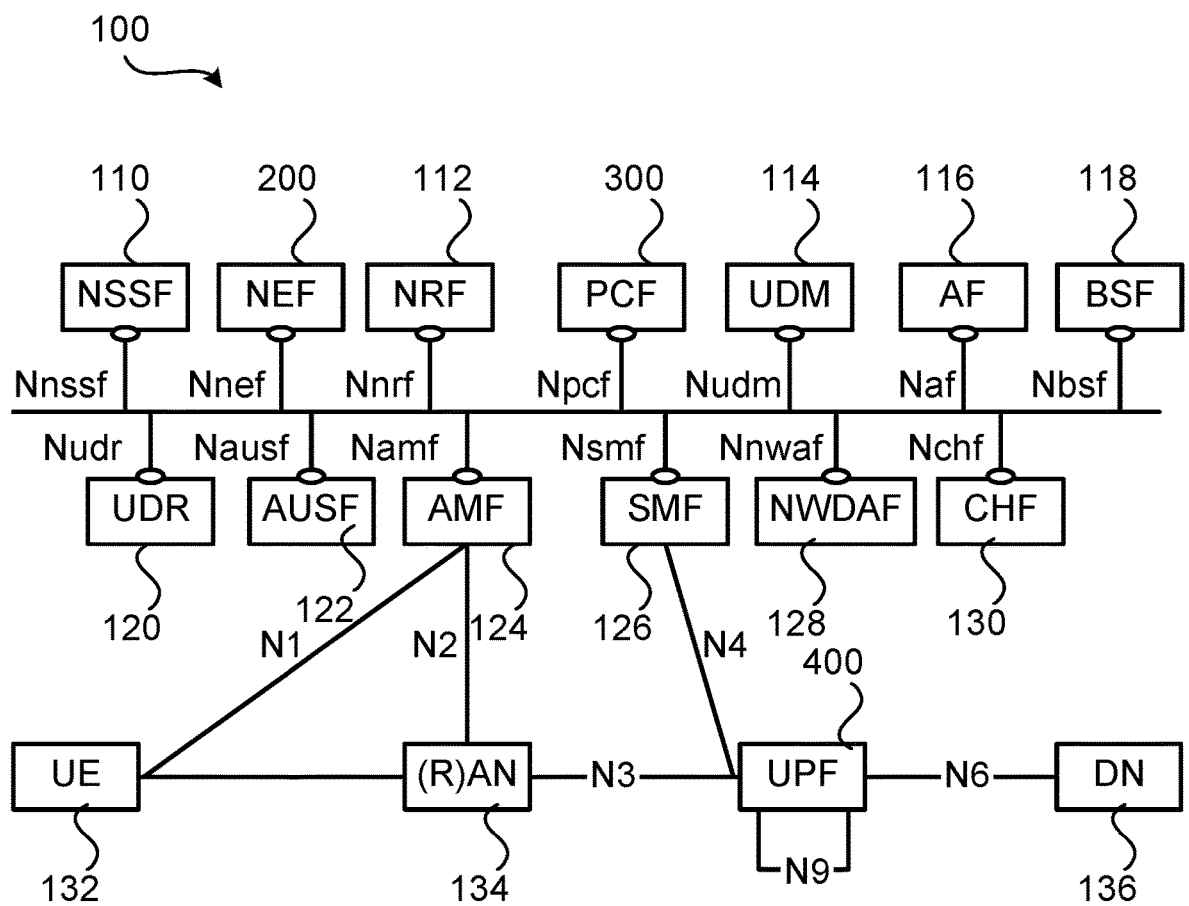
FIG. 1 is a schematic diagram illustrating a communication network according to embodiments.

FIG. 1 is a schematic diagram illustrating a communication network 100 where embodiments presented herein can be applied. Service based interfaces are in FIG. 1 represented by the format Nxyz (e.g., Nnssf, NNef, etc.) and point to point interfaces are represented by the format Nx (e.g. N1, N2, etc.). The communication network 100 represents a reference architecture of a fifth generation telecommunication system (5GS) and comprises the following entities: an Authentication Server Function (AUSF) 122, an Access and Mobility Management Function (AMF) 124, a Data Network (DN) 136, e.g. operator services, Internet access or 3rd party services, a Network Exposure Function (NEF) 200, a Network Repository Function (NRF) 112, a Network Slice Selection Function (NSSF) 110, a Policy Control Function (PCF) 300, a Session Management Function (SMF) 126, a Unified Data Management (UDM) 114, a Unified Data Repository (UDR) 120, a User Plane Function (UPF) 400, an Application Function (AF) 116, a User Equipment (UE) 132, a (Radio) Access Network ((R)AN) 134, a Network Data Analytics Function (NWDAF) 128, a Binding Support Function (BSF) 118, and a Charging Function (CHF) 130. The NEF 200 acts as the entry point into the network of the network operator, and so an external AF interacts with the 3GPP Core Network through the NEF 200. The PCF 300 supports a unified policy framework to govern the network behaviour and provides Policy and Charging Control PCC) rules to a Policy and Charging Enforcement Function (PCEF), defined by the SMF/UPF 400 that enforces policy and charging decisions according to provisioned PCC rules. The SMF receives PCC rules from the PCF 300 and configures the UPF 400 accordingly. The UPF 400 supports handling of user plane traffic based on the rules received from the SMF, and supports packet inspection and different enforcement actions such as traffic steering, Quality of service (QoS) enforcement, charging, etc.

As disclosed above there is still a need for enabling efficient monitoring, inspection and/or classification of traffic in a communications network. In more detail, to use network functions that optimize traffic or provide differential treatment when traffic is encrypted, the network operator and over the top (OTT) service providers might need to collaborate. Through this kind of collaboration, they can discover, negotiate and configure the existence of a proxy, e.g. a QUIC proxy or a QUIC performance enhancement function. However, there is currently no support for discovery of, and no support for use of, a collaborative proxy node (such as a QUIC proxy or a QUIC performance enhancement function) within 3GPP based communication networks.

The embodiments disclosed herein thus relate to mechanisms for enabling discovery of a collaborative proxy node in a 3GPP communication network. In order to obtain such mechanisms there is provided a network exposure function, a method performed by the network exposure function, a computer program product comprising code, for example in the form of a computer program, that when run on processing circuitry of the network exposure function, causes the network exposure function 200 to perform the method. In order to obtain such mechanisms there is further provided a policy control function 300, a method performed by the policy control function 300, and a computer program product comprising code, for example in the form of a computer program, that when run on processing circuitry of the policy control function 300, causes the policy control function 300 to perform the method. In order to obtain such mechanisms there is further provided a user plane function 400, a method performed by the user plane function 400, and a computer program product comprising code, for example in the form of a computer program, that when run on processing circuitry of the user plane function 400, causes the user plane function 400 to perform the method.

In some aspects, the herein disclosed embodiments are based on extending the 3GPP Nnef northbound interface by defining a new API allowing a content providing application function (AF) to request to the network operator the use of a collaborative proxy service, as provided by a collaborative proxy node, for a certain application and/or a certain flow in the application session of a user equipment. In some aspects, the herein disclosed embodiments are based on extending also the 3GPP Npcf, Nudr, Nsmf, and N4 interfaces. The collaborative proxy node is an entity, for example provided as a proxy, that logically resides between two endpoints of an application session that use encrypted communication. The collaborative proxy node might be provided either inside, or operatively connected to, the UPF 400 in FIG. 1.

The endpoints might share traffic information with the collaborative proxy node such that the collaborative proxy node is enabled to execute a requested performance enhancement function to improve the QoS of the traffic as well as to optimize operations within the communication network. Alternatively, the collaborative proxy node might provide additional information about the communication network which enables any of the endpoints to optimize its data transfer, e.g. use a more optimized congestion control or delay pre-fetching activities.

The user equipment might be made aware of the existence of the collaborative proxy service either directly from the communication network or by other communication with a peer entity. When a collaborative proxy node is discovered, the user equipment might open a connection to it, for example a QUIC connection when QUIC is used as a transport protocol, and request a collaborative proxy service.

Figure 2:
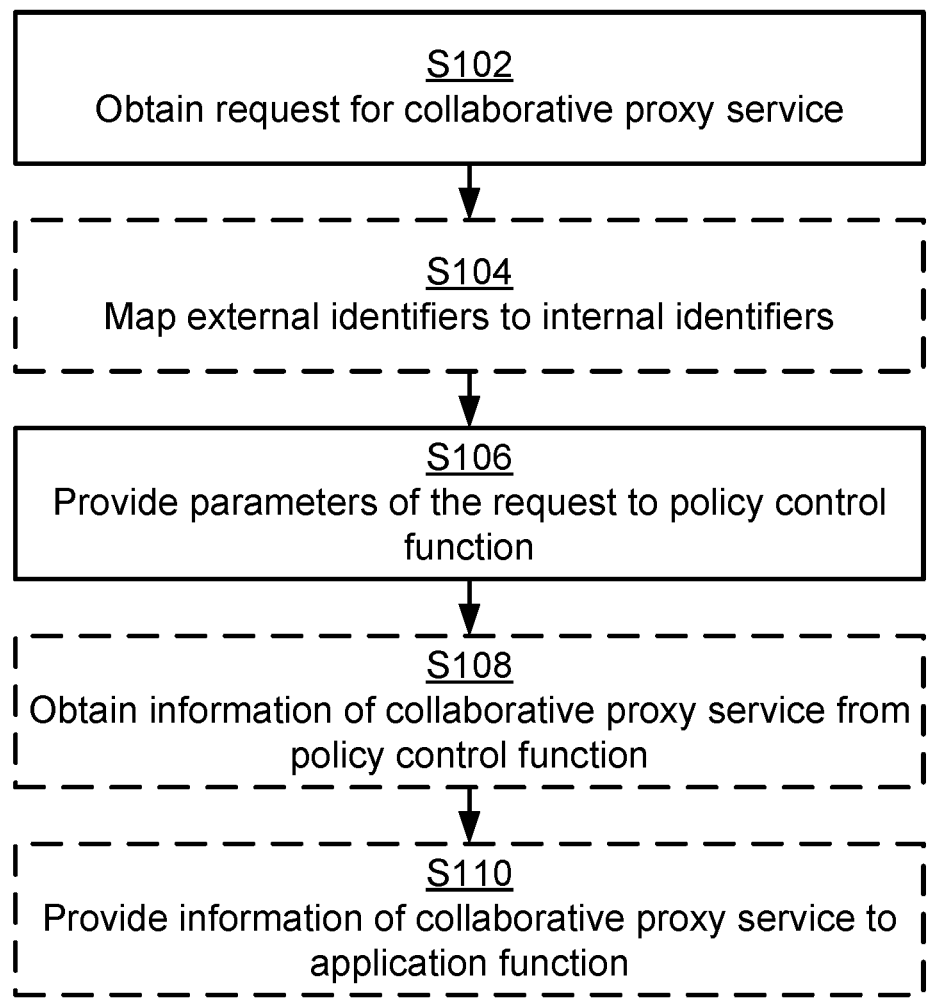
FIGS. 2, 3, and 4 are flowcharts of methods according to embodiments.

Reference is now made to FIG. 2 illustrating a method for enabling discovery of a collaborative proxy node in a 3GPP communication network as performed by the network exposure function 200 according to an embodiment.

S102: The network exposure function 200 obtains, from a content providing application function, a request for a collaborative proxy service to be performed for application traffic between the application function and a user equipment. The collaborative proxy service is performed by the collaborative proxy node.

S106: The network exposure function 200 provides, upon having authorized the request, parameters as obtained in the request to a policy control function 300. The network exposure function 200 thereby enables discovery of the collaborative proxy node.

Embodiments relating to further details of enabling discovery of a collaborative proxy node in a 3GPP communication network as performed by the network exposure function 200 will now be disclosed.

In some embodiments, the request is obtained in a Nnef HTTP POST message and in addition to the request for the collaborative proxy service comprises an identifier of the application function, an external identifier of the application of the application traffic, and an external identifier of the user equipment.

In some embodiments, the parameters are, to the policy control function 300, provided in a Npcf HTTP POST message.

In some embodiments, the network exposure function 200 is configured to perform S104:

S104: The network exposure function 200 maps the external identifier of the application to an internal identifier of the application, and maps the external identifier of the user equipment to an internal identifier of the user equipment.

In some embodiments, the network exposure function 200 is configured to perform S108:

S108: The network exposure function 200 obtains, from the policy control function 300, information of the collaborative proxy service.

In some embodiments, the network exposure function 200 is configured to perform S110:

S110: The network exposure function 200 provides, to the application function, the information of the collaborative proxy service.

In some embodiments, the information of the collaborative proxy service comprises an identifier of the collaborative proxy node, a validity time parameter, and a certificate of the collaborative proxy node.

Figure 3:
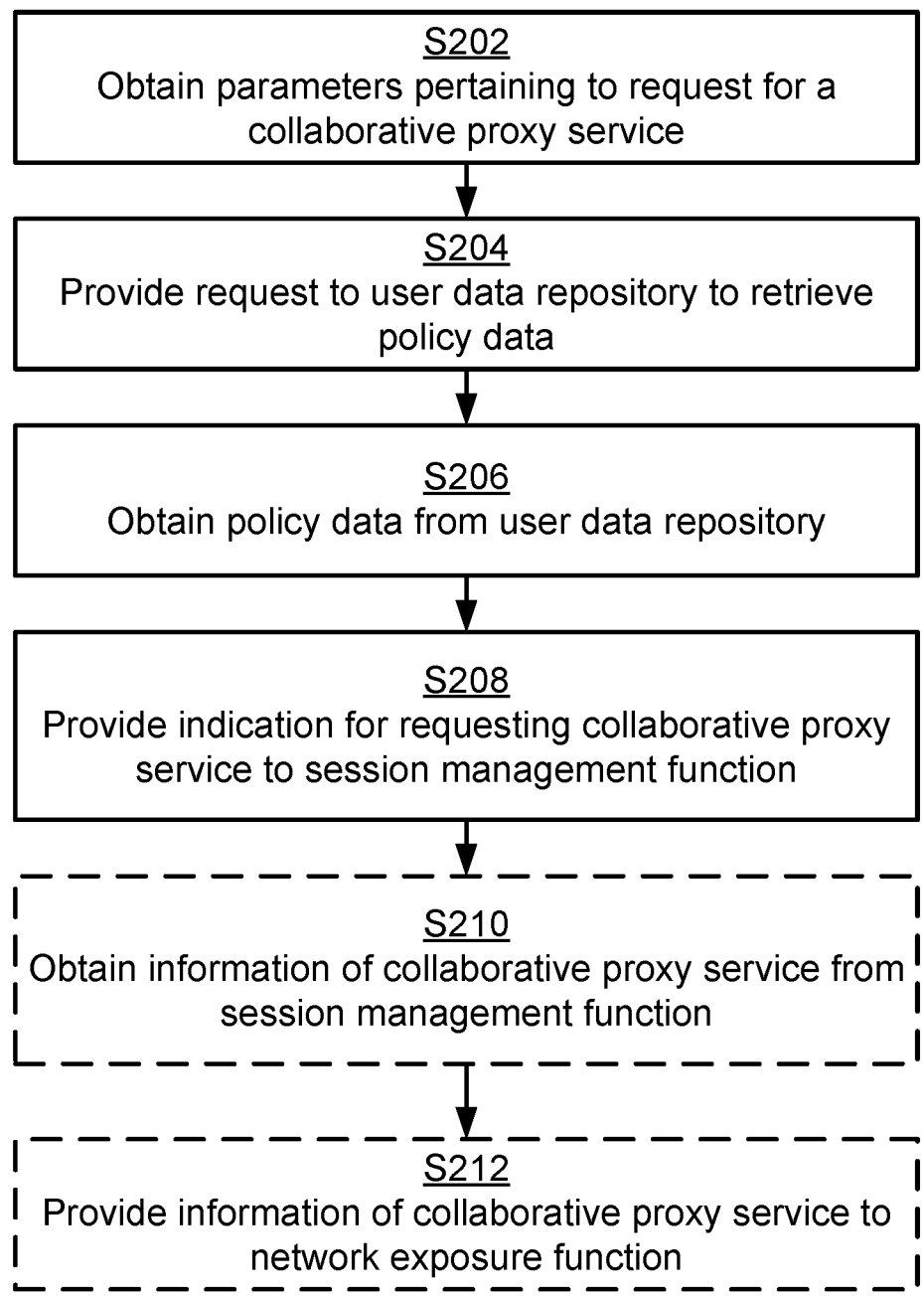

Reference is now made to FIG. 3 illustrating a method for enabling discovery of a collaborative proxy node in a 3GPP communication network as performed by the policy control function 300 according to an embodiment.

S202: The policy control function 300 obtains, from a network exposure function 200, parameters pertaining to a request for a collaborative proxy service to be performed for application traffic between a content providing application function and a user equipment. The collaborative proxy service is performed by the collaborative proxy node.

S204: The policy control function 300 provides a request to a user data repository to retrieve policy data for the user equipment.

S206: The policy control function 300 obtaining, from the user data repository, the policy data for the user equipment. The policy data at least comprises a policy for the collaborative proxy service.

S208: The policy control function 300 provides, to a session management function, an indication for requesting the collaborative proxy service to be performed for application traffic. The request is accompanied by policy and charging rules, as created for an application of the application traffic. The policy control function 300 thereby enables discovery of the collaborative proxy node.

Embodiments relating to further details of enabling discovery of a collaborative proxy node in a 3GPP communication network as performed by the policy control function 300 will now be disclosed.

In some embodiments, the parameters are, from the network exposure function 200, obtained in a Npcf HTTP POST message and in addition to the request for the collaborative proxy service comprises an identifier of the application function, an external identifier of the application of the application traffic, and an external identifier of the user equipment.

In some embodiments, the policy control function 300 is configured to perform S210:

S210: The policy control function 300 obtains, from a session management function, information of the collaborative proxy service.

In some embodiments, the policy control function 300 is configured to perform S212:

S212: The policy control function 300 provides, to the network exposure function 200, the information of the collaborative proxy service.

In some embodiments, the information of the collaborative proxy service comprises an identifier of the collaborative proxy node, a validity time parameter, and a certificate of the collaborative proxy node.

Figure 4:
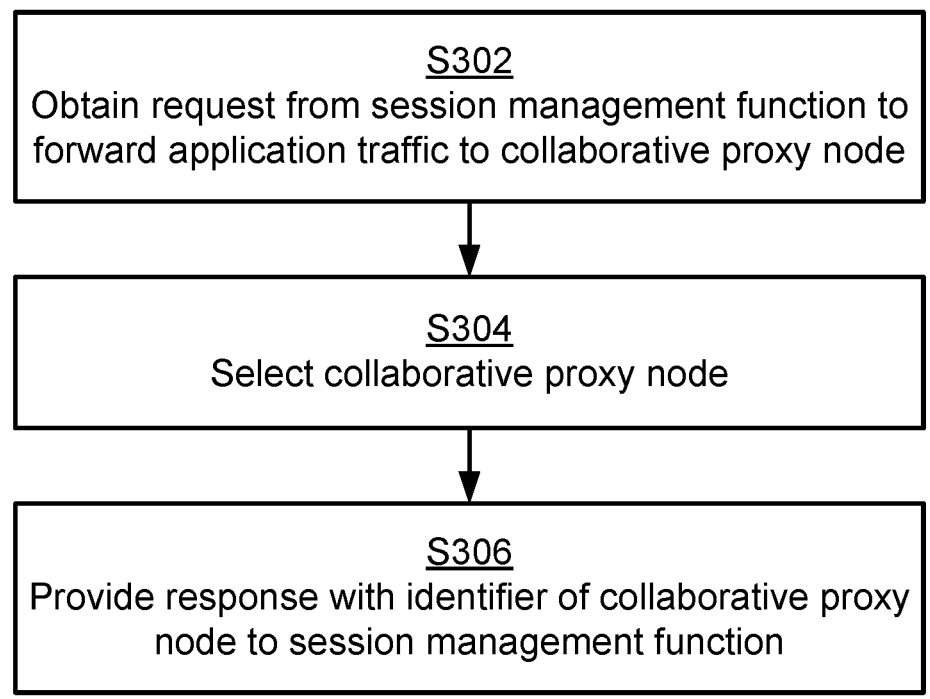

Reference is now made to FIG. 4 illustrating a method for enabling discovery of a collaborative proxy node in a 3GPP communication network as performed by the user plane function 400 according to an embodiment.

S302: The user plane function 400 obtains, from a session management function, a request for the user plane function 400 entity to forward application traffic between a content providing application function and a user equipment to the collaborative proxy node.

S304: The user plane function 400 selects the collaborative proxy node from a set of at least one available collaborative proxy node.

S306: The user plane function 400 provides, to the session management function, a response. The response comprises an identifier of the selected collaborative proxy node. The user plane function 400 thereby enables discovery of the collaborative proxy node.

Embodiments relating to further details of enabling discovery of a collaborative proxy node in a 3GPP communication network as performed by the user plane function 400 will now be disclosed.

In some embodiments, the request is a Packet Forwarding Control Protocol Session Modification Request message and comprises a forwarding action rule, and the collaborative proxy node is selected based on the forwarding action rule.

In some embodiments, the response is a Packet Forwarding Control Protocol Session Modification Response message and further comprises a validity time parameter, and a certificate of the collaborative proxy node.

Figure 5:
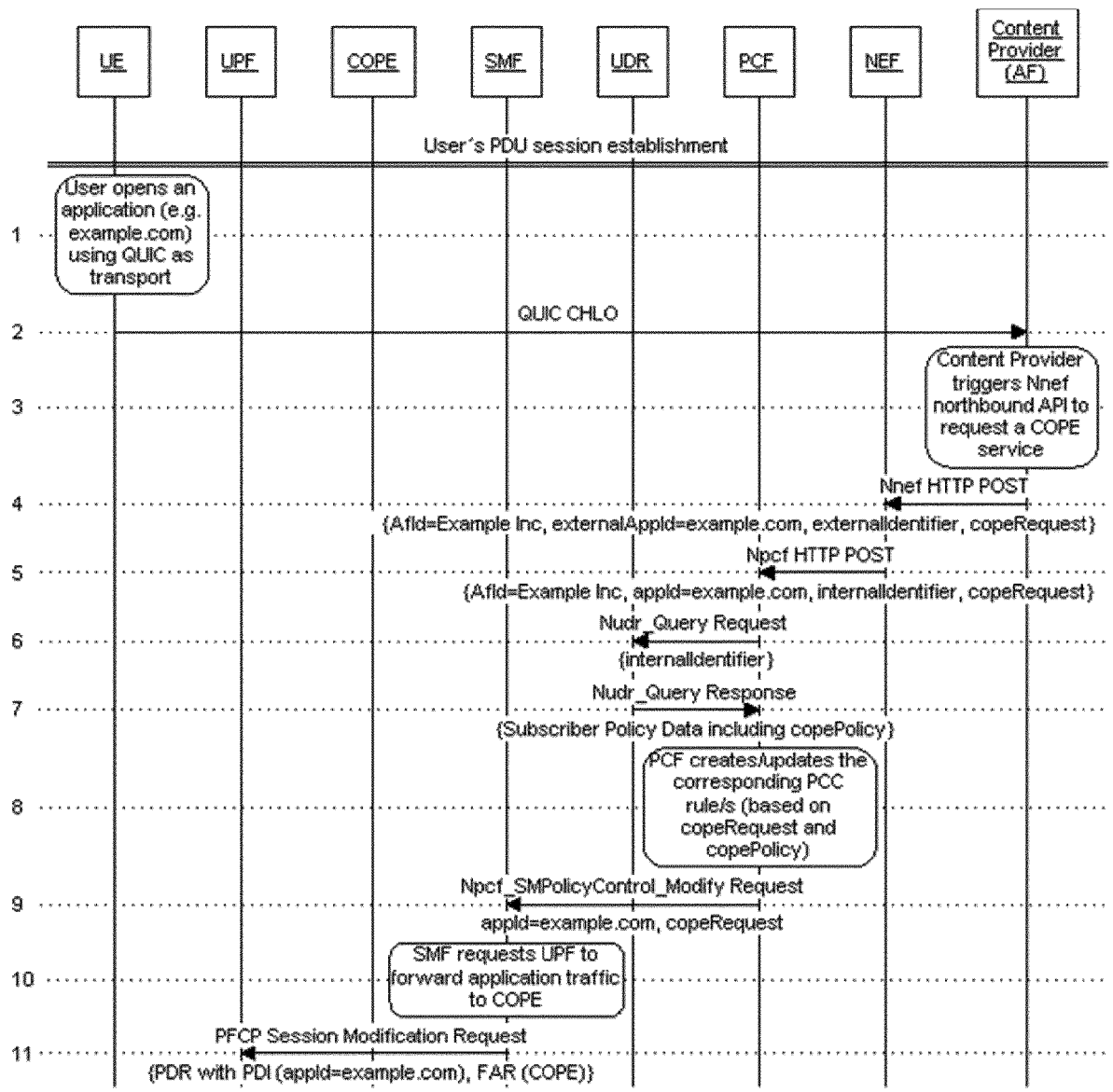
FIG. 5 is a signalling diagram of a method according to an embodiment.
Figure 5:
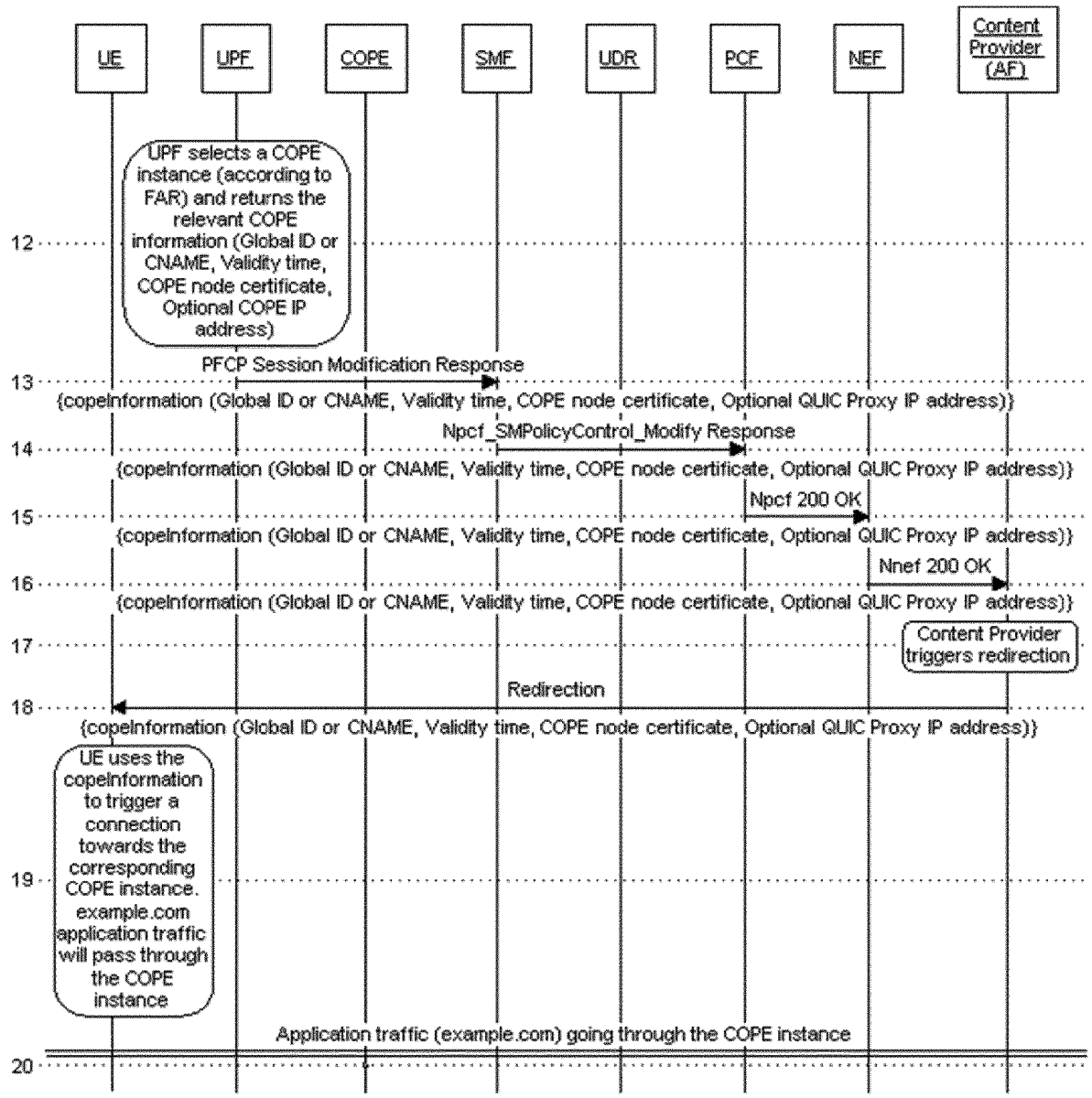

One particular embodiment for enabling discovery of a collaborative proxy node in a 3GPP communication network based on at least some of the above disclosed embodiments will now be disclosed in detail with reference to the signalling diagram of FIG. 5. In FIG. 5, each horizontal line represents one step, all of which will be described below.

In some aspects it is assumed that the content providing AF has a service level agreement (SLA) in place with the network operator. The AF might then install policies for the application traffic of interest through the 3GPP Nnef northbound API to explicitly leverage COPE capabilities provided by the network operator. When the UE starts the session towards the AF, the AF sends a request for COPE towards the network operator through the NEF 200. The network operator authorizes the request for a certain application, indicating that it wants to explicitly use the COPE function and the required COPE capabilities. The AF obtains the COPE information from the network operator and sends it towards the UE. The application then starts the communication with COPE to establish a multi-layer security context with QUIC towards the AF.

In the signalling diagram is illustrated an example where a content providing AF requests a proxy service, in terms of a collaborative proxy service, from the network, for a certain application (e.g. Example.com). In this illustrative example it might be assumed that the UE has already established an PDU session. In this illustrative example it might further be assumed that there exists a default policy to handle applications (e.g. Example.com), which could be based on an existing SLA between the network operator and the AF.

Steps 1 and 2) The UE opens an application (e.g. Example.com) using QUIC as transport protocol and triggers a QUIC CHLO message to the content providing AF.

Steps 3 and 4) The content providing AF triggers a new procedure towards the network operator. A Nnef northbound API might be defined to request a collaborative proxy service. For initial application session creation, the AF sends an HTTP POST message to the NEF 200. The body of HTITP POST message comprises an AF identifier (e.g. Example Inc.), an external Application Identity (e.g. Example.com), an external UE Identifier (e.g. Generic Public Subscriber Identifier; GPSI) and a COPE Request (which might be defined only as a flag set to request a generic collaborative proxy service or might comprise more detailed information on which Collaborative proxy service, or services, is requested).

Step 5) After receiving the message in Step 4, the NEF 200 authorizes the request, maps the external Application Identity to an (internal) external Application Identity, maps the external UE Identifier (e.g. GPSI) to an internal UE Identifier (e.g. a Subscription Permanent Identifier; SUPI), and interacts with the PCF 300 handling the user session by sending a Npcf HTTP POST messages comprising the parameters indicated above (i.e., AF identifier, external Application Identity, internal UE Identifier and COPE Request).

Step 6) The PCF 300 sends a Nudr_Query Request message to the UDR for the UDR to retrieve the policy data for the subscriber defined by the internal UE Identifier.

Step 7) The UDR replies with Nudr_Query Response message comprising Subscriber Policy Data, which in turn comprises a COPE Policy (which might be defined only as a flag set to indicate that a collaborative proxy service, or services, is allowed for this subscriber).

Steps 8 and 9) The PCF 300 creates and/or updates corresponding PCC rule(s) (based on the COPE Request and the COPE Policy)) and sends a Npcf_SMPolicyControl_Modify Request message to the SMF, by creating/updating a PCC rule for the application identifier (with external Application Identity=Example.com) and an indication to request COPE (COPE Request). The PCC rule might comprise COPE policies.

Steps 10 and 11) The SMF requests the UPF 400 to forward the application traffic to the collaborative proxy node, by sending a PFCP Session Modification Request comprising at least the following parameters: a Packet Detection Rule (PDR) with Packet Detection Information (PDI) given as external Application Identity=Example.com and a forwarding action rule (FAR) comprising a Forwarding Policy indicating that the application traffic between the UE and the AF should be forwarded to the collaborative proxy node.

Steps 12 and 13) The UPF 400 selects a collaborative proxy node (according to the FAR received in Step 11) and returns relevant COPE information (Global ID of the collaborative proxy node or Canonical Name Record or Alias Record (CNAME) of the collaborative proxy node, a validity time, collaborative proxy node certificate, and the COPE IP address (optionally)) to the SMF in a PFCP Session Modification Response message.

Step 14) The SMF sends a Npcf_SMPolicyControl_Modify Response message, comprising the COPE information, to the PCF 300.

Step 15) The PCF 300 sends a Npcf 200 OK response message, comprising the COPE information, to the NEF 200.

Step 16) The NEF 200 sends a Nnef 200 OK Response message, comprising the COPE information, to the AF.

Steps 17 and 18) The AF indicates to the UE to redirect the application traffic, and in provides the COPE information to the UE.

Step 19) The application (Example.com) run by the UE uses the COPE information to identify the collaborative proxy node (either by means of a Domain Name System (DNS) procedure or directly through the COPE IP address, when provided). The application client (Example.com app) will establish a connection towards the collaborative proxy node (e.g. by the application client creating an outer QUIC connection to the collaborative proxy node).

Step 20) The application traffic between the AF and the UE passes through the collaborative proxy node.

In case the validity time expires, the UE triggers a new Policy Activation Request, allowing the network to, potentially, select a different collaborative proxy node.

The collaborative proxy node could (e.g. at power on) register itself in the Network Resource Function (NRF) and indicate its capabilities (e.g. COPE aimed for Traffic Optimization, Probing, etc.), so that the correct COPE is selected in step 12 based on these capabilities. In the particular case the collaborative proxy node is provided in terms of a logical function inside UPF 400, the UPF 400 might register the COPE capabilities in the NRF, influencing in UPF selection or reselection.

Figure 6:
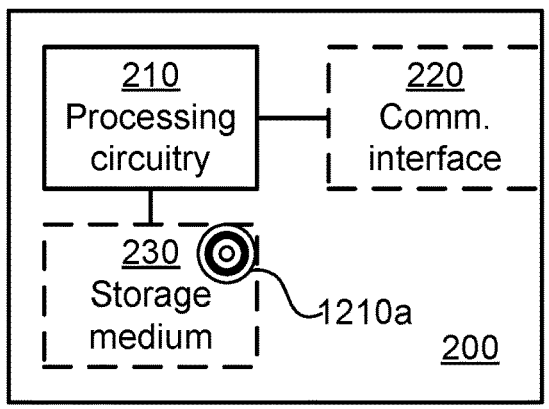
FIG. 6 is a schematic diagram showing functional units of a network exposure function according to an embodiment.

FIG. 6 schematically illustrates, in terms of a number of functional units, the components of a network exposure function 200 according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network exposure function 200 to perform a set of operations, or steps, as disclosed above. For example, the storage medium 230 may store the set of operations, and the processing circuitry 210 may be configured to retrieve the set of operations from the storage medium 230 to cause the network exposure function 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network exposure function 200 may further comprise a communications interface 220 for communications with other functions nodes, entities, an entities, as in FIG. 1. As such the communications interface 220 may comprise one or more transmitters and receivers, comprising analogue and digital components.

The processing circuitry 210 controls the general operation of the network exposure function 200 e.g. by sending data and control signals to the communications interface 220 and the storage medium 230, by receiving data and reports from the communications interface 220, and by retrieving data and instructions from the storage medium 230. Other components, as well as the related functionality, of the network exposure function 200 are omitted in order not to obscure the concepts presented herein.

Figure 7:
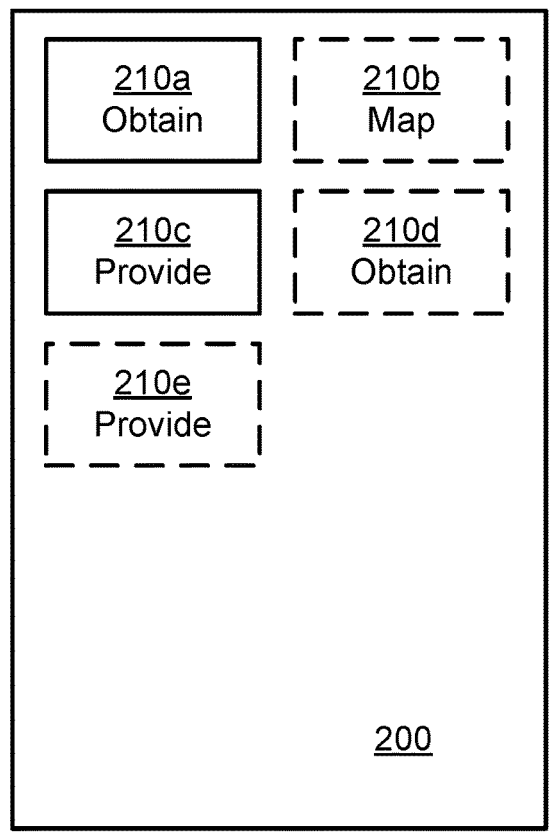
FIG. 7 is a schematic diagram showing functional modules of a network exposure function according to an embodiment.

FIG. 7 schematically illustrates, in terms of a number of functional modules, the components of a network exposure function 200 according to an embodiment. The network exposure function 200 of FIG. 7 comprises a number of functional modules; an obtain module 210*a* configured to perform step S102, and a provide module 210*c* configured to perform step S106. The network exposure function 200 of FIG. 7 may further comprise a number of optional functional modules, such as any of a map module 210*b* configured to perform step S104, an obtain module 210*d* configured to perform step S108, and a provide module 210*e* configured to perform step S110. In general terms, each functional module 210*a*-210*e* may be implemented in hardware or in software. Preferably, one or more or all functional modules 210*a*-210*e* may be implemented by the processing circuitry 210, possibly in cooperation with the communications interface 220 and the storage medium 230. The processing circuitry 210 may thus be arranged to from the storage medium 230 fetch instructions as provided by a functional module 210*a*-210*e* and to execute these instructions, thereby performing any steps of the network exposure function 200 as disclosed herein.

Figure 8:
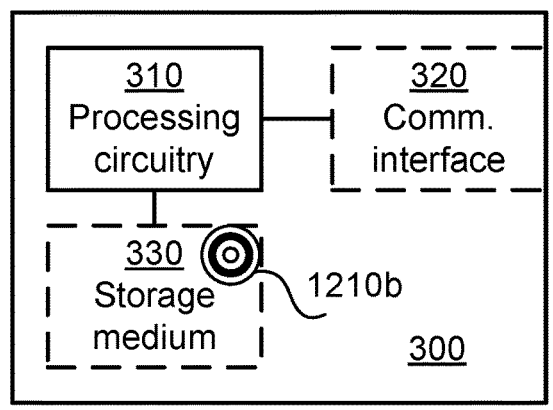
FIG. 8 is a schematic diagram showing functional units of a policy control function according to an embodiment.

FIG. 8 schematically illustrates, in terms of a number of functional units, the components of a policy control function 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210*b* (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the policy control function 300 to perform a set of operations, or steps, as disclosed above. For example, the storage medium 330 may store the set of operations, and the processing circuitry 310 may be configured to retrieve the set of operations from the storage medium 330 to cause the policy control function 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The policy control function 300 may further comprise a communications interface 320 for communications with functions nodes, entities, an entities, as in FIG. 1. As such the communications interface 320 may comprise one or more transmitters and receivers, comprising analogue and digital components.

The processing circuitry 310 controls the general operation of the policy control function 300 e.g. by sending data and control signals to the communications interface 320 and the storage medium 330, by receiving data and reports from the communications interface 320, and by retrieving data and instructions from the storage medium 330. Other components, as well as the related functionality, of the policy control function 300 are omitted in order not to obscure the concepts presented herein.

Figure 9:
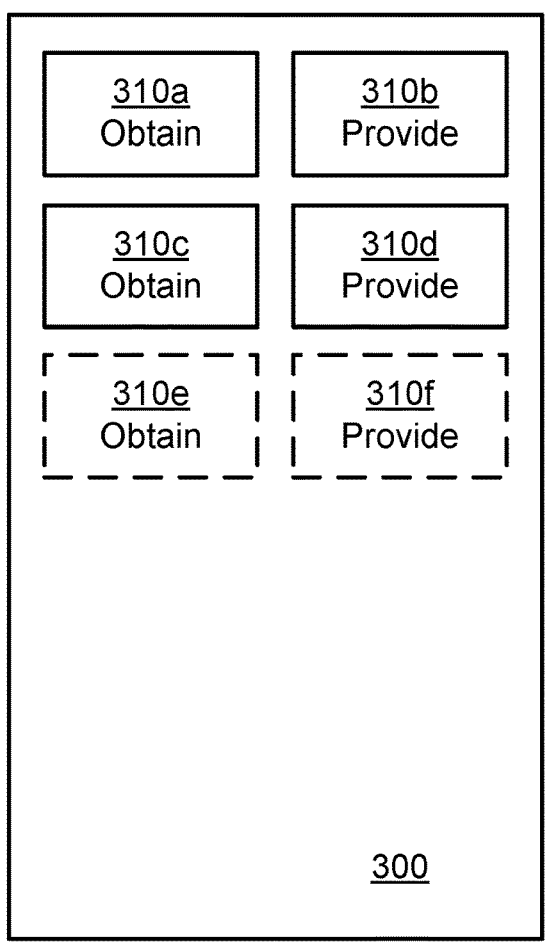
FIG. 9 is a schematic diagram showing functional modules of a policy control function according to an embodiment.

FIG. 9 schematically illustrates, in terms of a number of functional modules, the components of a policy control function 300 according to an embodiment. The policy control function 300 of FIG. 9 comprises a number of functional modules; an obtain module 310a configured to perform step S202, a provide module 310b configured to perform step S204, an obtain module 310c configured to perform step S206, and a provide module 310d configured to perform step S208. The policy control function 300 of FIG. 9 may further comprise a number of optional functional modules, such as any of an obtain module 310e configured to perform step S210, and a provide module 310f configured to perform step S212. In general terms, each functional module 310a-310f may be implemented in hardware or in software. Preferably, one or more or all functional modules 310a-310f may be implemented by the processing circuitry 310, possibly in cooperation with the communications interface 320 and the storage medium 330. The processing circuitry 310 may thus be arranged to from the storage medium 330 fetch instructions as provided by a functional module 310a-310f and to execute these instructions, thereby performing any steps of the policy control function 300 as disclosed herein.

Figure 10:
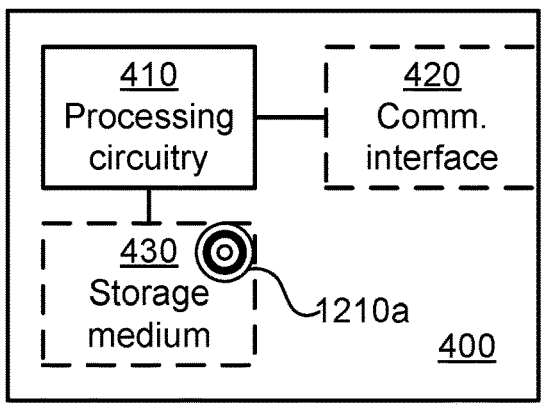
FIG. 10 is a schematic diagram showing functional units of a user plane function according to an embodiment.

FIG. 10 schematically illustrates, in terms of a number of functional units, the components of a user plane function 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1210c (as in FIG. 12), e.g. in the form of a storage medium 430. The processing circuitry 410 may further be provided as at least one application specific integrated circuit (ASIC), or field programmable gate array (FPGA).

Particularly, the processing circuitry 410 is configured to cause the user plane function 400 to perform a set of operations, or steps, as disclosed above. For example, the storage medium 430 may store the set of operations, and the processing circuitry 410 may be configured to retrieve the set of operations from the storage medium 430 to cause the user plane function 400 to perform the set of operations.

The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The user plane function 400 may further comprise a communications interface 420 for communications with functions nodes, entities, an entities, as in FIG. 1. As such the communications interface 420 may comprise one or more transmitters and receivers, comprising analogue and digital components.

The processing circuitry 410 controls the general operation of the user plane function 400 e.g. by sending data and control signals to the communications interface 420 and the storage medium 430, by receiving data and reports from the communications interface 420, and by retrieving data and instructions from the storage medium 430. Other components, as well as the related functionality, of the user plane function 400 are omitted in order not to obscure the concepts presented herein.

Figure 11:
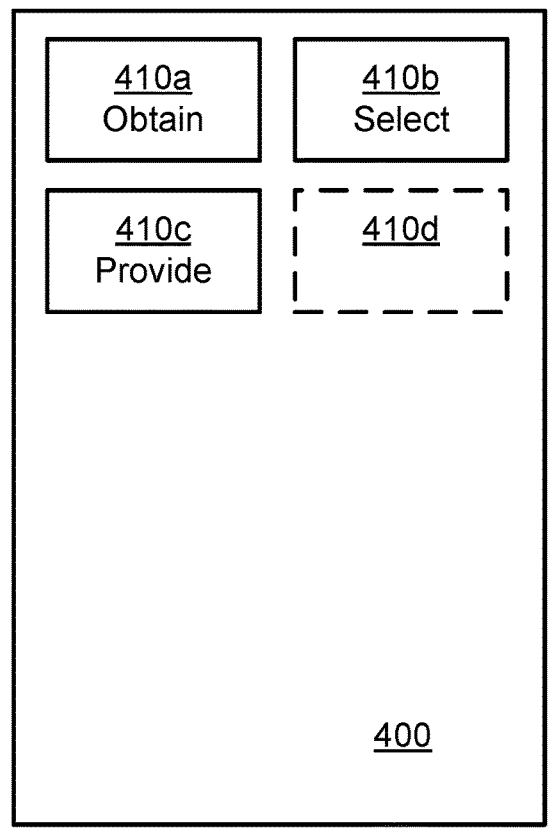
FIG. 11 is a schematic diagram showing functional modules of a user plane function according to an embodiment.

FIG. 11 schematically illustrates, in terms of a number of functional modules, the components of a user plane function 400 according to an embodiment. The user plane function 400 of FIG. 11 comprises a number of functional modules; an obtain module 410a configured to perform step S302, a select module 410b configured to perform step S304, and a provide module 410c configured to perform step S306. The user plane function 400 of FIG. 11 may further comprise a number of optional functional modules, as represented by functional module 410d. In general terms, each functional module 410a-410d may be implemented in hardware or in software. Preferably, one or more or all functional modules 410a-410d may be implemented by the processing circuitry 410, possibly in cooperation with the communications interface 420 and the storage medium 430. The processing circuitry 410 may thus be arranged to from the storage medium 430 fetch instructions as provided by a functional module 410a-410d and to execute these instructions, thereby performing any steps of the user plane function 400 as disclosed herein.

Figure 12:
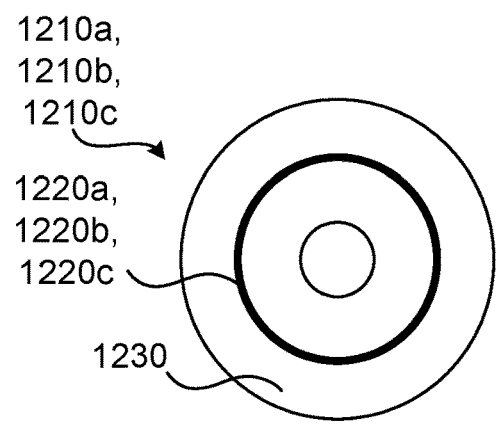
FIG. 12 shows one example of a computer program product comprising computer readable means according to an embodiment.

FIG. 12 shows one example of a computer program product 1210a, 1210b, 1210c comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the network exposure function 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the policy control function 300 as herein disclosed. On this computer readable means 1230, a computer program 1220c can be stored, which computer program 1220c can cause the processing circuitry 410 and thereto operatively coupled entities and devices, such as the communications interface 420 and the storage medium 430, to execute methods according to embodiments described herein. The computer program 1220c and/or computer program product 1210c may thus provide means for performing any steps of the user plane function 400 as herein disclosed.

In the example of FIG. 12, the computer program product 1210a, 1210b, 1210c is illustrated as an optical disc, such as a CD (compact disc) or a DVD (digital versatile disc) or a Blu-Ray disc. The computer program product 1210a, 1210b, 1210c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b, 1220c is here schematically shown as a track on the depicted optical disk, the computer program 1220a, 1220b, 1220c can be stored in any way which is suitable for the computer program product 1210a, 1210b, 1210c.

As the skilled person understands, although some of the above disclosed embodiments, functions, nodes, devices and entities, have been described in the context of a 5G network, the herein disclosed embodiments are equally applicable also in a 4G network where the functionality of the AF is provided by a Service Capability Server, the functionality of the NEF 200 is provided by a Service Capability Exposure Function, the functionality of the PCF 300 is provided by a Policy Control and Charging Rules Function, the functionality of the SMF is provided by a Packet Data Network Gateway as implemented in the control plane or a Traffic Detection Function as implemented in the control plane, and the functionality of the UPF 400 is provided by a Packet Data Network Gateway as implemented in the user plane or a Traffic Detection Function as implemented in the user plane.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling discovery of a collaborative proxy node in a 3GPP communication network, the method being performed by a network exposure function, the method comprising:
   obtaining, from a content providing application function, a request for a collaborative proxy service to be performed for application traffic between the application function and a user equipment, the collaborative proxy service being performed by the collaborative proxy node; and
   providing, upon having authorized the request, parameters as obtained in the request to a policy control function, thereby enabling discovery of the collaborative proxy node.

2. The method of claim 1, wherein the request is obtained in a Nnef HTTP POST message and in addition to the request for the collaborative proxy service comprises an identifier of the application function, an external identifier of the application of the application traffic, and an external identifier of the user equipment.

3. The method of claim 2, wherein the parameters are, to the policy control function, provided in a Npcf HTTP POST message.

4. The method of claim 1, further comprising:
   mapping the external identifier of the application to an internal identifier of the application, and mapping the external identifier of the user equipment to an internal identifier of the user equipment.

5. The method of claim 1, further comprising:
   obtaining, from the policy control function, information of the collaborative proxy service.

6. The method of claim 5, further comprising:
   providing, to the application function, the information of the collaborative proxy service.

7. The method of claim 5, wherein the information of the collaborative proxy service comprises an identifier of the collaborative proxy node, a validity time parameter, and a certificate of collaborative proxy node.

8. A network exposure function for enabling discovery of a collaborative proxy node in a 3GPP communication network, the network exposure function comprising processing circuitry, the processing circuitry being configured to cause the network exposure function to perform the method of claim 1.

9. A method for enabling discovery of a collaborative proxy node in a 3GPP communication network, the method being performed by a policy control function, the method comprising:
   obtaining, from a network exposure function, parameters pertaining to a request for a collaborative proxy service to be performed for application traffic between a content providing application function and a user equipment, the collaborative proxy service being performed by the collaborative proxy node;
   providing a request to a user data repository to retrieve policy data for the user equipment;
   obtaining, from the user data repository, the policy data for the user equipment, the policy data at least comprising a policy for the collaborative proxy service; and
   providing, to a session management function, an indication for requesting the collaborative proxy service to be performed for application traffic, the request being accompanied by policy and charging rules, as created for an application of the application traffic, thereby enabling discovery of the collaborative proxy node.

10. The method of claim 9, wherein the parameters are, from the network exposure function, obtained in a Npcf HTTP POST message and in addition to the request for the collaborative proxy service comprises an identifier of the application function, an external identifier of the application of the application traffic, and an external identifier of the user equipment.

11. The method of claim 9, further comprising:
   obtaining, from a session management function, information of the collaborative proxy service.

12. The method of claim 11, further comprising:
   providing, to the network exposure function, the information of the collaborative proxy service.

13. The method of claim 11, wherein the information of the collaborative proxy service comprises an identifier of the collaborative r node, a validity time parameter, and a certificate of the collaborative proxy node.

14. A policy control function for enabling discovery of a collaborative proxy node in a 3GPP communication network, the policy control function comprising processing circuitry, the processing circuit being configured to cause the policy control function to perform the method of claim 9.

* * * * *